US011278869B2

(12) United States Patent
Kukade et al.

(10) Patent No.: US 11,278,869 B2
(45) Date of Patent: Mar. 22, 2022

(54) FLUID CATALYTIC CRACKING (FCC) PROCESS AND APPARATUS FOR PRODUCTION OF LIGHT OLEFINS

(71) Applicant: HINDUSTAN PETROLEUM CORPORATION LIMITED, Churchgate Mumbai (IN)

(72) Inventors: Somanath Kukade, Bangalore (IN); Pramod Kumar, Bangalore (IN); Venkata Chalapathi Rao Peddy, Bangalore (IN); Sriganesh Gandham, Bangalore (IN)

(73) Assignee: HINDUSTAN PETROLEUM CORPORATION LTD., Churchgate Mumbai (IN)

( * ) Notice: Subject to any disclaimer, the term of this patent is extended or adjusted under 35 U.S.C. 154(b) by 80 days.

(21) Appl. No.: 16/346,291

(22) PCT Filed: Oct. 17, 2017

(86) PCT No.: PCT/IN2017/050479
§ 371 (c)(1),
(2) Date: Apr. 30, 2019

(87) PCT Pub. No.: WO2019/038777
PCT Pub. Date: Feb. 28, 2019

(65) Prior Publication Data
US 2020/0055025 A1    Feb. 20, 2020

(30) Foreign Application Priority Data
Aug. 25, 2017    (IN) .............................. 201721030227

(51) Int. Cl.
*B01J 21/00* (2006.01)
*B01J 21/12* (2006.01)
(Continued)

(52) U.S. Cl.
CPC ............. *B01J 21/12* (2013.01); *B01J 29/084* (2013.01); *B01J 29/088* (2013.01); *B01J 29/42* (2013.01);
(Continued)

(58) Field of Classification Search
CPC ........ B01J 21/12; B01J 29/084; B01J 29/088; B01J 29/405; B01J 29/42; B01J 29/46;
(Continued)

(56) References Cited

U.S. PATENT DOCUMENTS 4,717,466 A    1/1988 Herbst et al.
10,287,511 B2 *    5/2019 Kumar .................. B01J 29/088
(Continued)

FOREIGN PATENT DOCUMENTS

WO    2016/199164    12/2016
WO    2017/068599    4/2017

OTHER PUBLICATIONS

International Search Report for PCT/IN2017/050479, dated Aug. 28, 2018, 6 pages.
(Continued)

*Primary Examiner* — Sharon Pregler
(74) *Attorney, Agent, or Firm* — Nixon & Vanderhye P.C.

(57) ABSTRACT

The instant disclosure provides a composition for fluid catalytic cracking of petroleum based feedstock into useful short chain olefins. The composition comprising: 76-86% of a non-zeolitic material; and 2-30% of at least one zeolite material, the percentage being based on weight of the catalyst composition, wherein one of the zeolites has been modified with 0.1-2.5 wt % metal. The said catalyst was found to be selective in enhancing the usable propylene gas content, while reducing the undesirable dry gas content of the cracked olefinic products. The present disclosure also provides a process for the preparation of the composition. The present disclosure also provides an apparatus (100) and process (200) for fluid catalytic cracking to obtain light olefins. The apparatus comprises a second riser (33) that includes a lower dense riser (2) and upper dilute riser (3).
(Continued)

Further, the lower dense riser (2) has a diameter that is 1.1 to 2 times that of the upper dilute riser (3).

13 Claims, 2 Drawing Sheets

(51) Int. Cl.
| | |
|---|---|
| *B01J 29/08* | (2006.01) |
| *B01J 29/42* | (2006.01) |
| *B01J 29/70* | (2006.01) |
| *B01J 37/00* | (2006.01) |
| *B01J 37/02* | (2006.01) |
| *C10G 11/05* | (2006.01) |
| *C10G 11/18* | (2006.01) |

(52) U.S. Cl.
CPC ....... *B01J 29/7092* (2013.01); *B01J 37/0045* (2013.01); *B01J 37/0236* (2013.01); *C10G 11/05* (2013.01); *B01J 2208/00902* (2013.01); *B01J 2229/186* (2013.01); *C10G 11/18* (2013.01); *C10G 2400/20* (2013.01)

(58) Field of Classification Search
CPC .... B01J 29/48; B01J 29/7007; B01J 29/7092; B01J 29/7684; B01J 29/7884; B01J 29/80; B01J 29/85; B01J 29/90
See application file for complete search history.

(56) References Cited

U.S. PATENT DOCUMENTS

| | | |
|---|---|---|
| 2012/0108876 A1 | 5/2012 | Chewter et al. |
| 2015/0298107 A1 | 10/2015 | Ludvig et al. |

OTHER PUBLICATIONS

Written Opinion of the ISA for PCT/IN2017/050479, dated Aug. 28, 2018, 14 pages.

\* cited by examiner

FLUID CATALYTIC CRACKING (FCC) PROCESS AND APPARATUS FOR PRODUCTION OF LIGHT OLEFINS

This application is the U.S. national phase of International Application No. PCT/IN2017/050479 filed 17 Oct. 2017, which designated the U.S. and claims priority to IN Patent Application No. 201721030227 filed 25 Aug. 2017, the entire contents of each of which are hereby incorporated by reference.

FIELD OF THE INVENTION

The present disclosure generally relates to the field of oil and petroleum refining, and in particular to a composition, an apparatus and a process for catalytic cracking of petroleum.

BACKGROUND OF THE INVENTION

Hydrocarbon fuel such as diesel, petrol and gasoline are the lifeline of any strong economy. With the introduction of modern automobile engines and the associated problems of 'knocking', the reliance on high-octane fuel has tremendously increased. It was estimated that gasoline consumption (in US) exceeded 143 billion gallons in 2016. Such enormous consumption places an immense strain on the supply chain. The enhancement of gasoline availability to address the ever-swelling needs may be effected by a two-pronged approach involving—a) exploration and discovery of new oil sites and b) improvements in petroleum refining process.

An important step in the petroleum refining process is cracking. Petroleum cracking involves conversion of long chain carbon olefins into valuable short chain olefins such as isooctanes. Traditional cracking was carried out using thermal processes, however the switch to catalytic cracking methods in the 1930s brought about an increase in petroleum conversion efficiency and also an enhancement in the octane selectivity. Modern petroleum refineries carry out catalytic cracking process using alumina and silica. Such mesoporous materials are thermally stable, provide high conversion rates and work reliably over long periods of time. Additionally, modern reactors are commonly run at high temperatures, wherein the finely divided catalyst can get fluidized, allowing better catalyst-substrate interactions (fluid catalyzed cracking or FCC).

Selectivity of products during the cracking process is a challenge. Typically, the process of cracking not only yields octanes but also a variety of short chain olefins such as ethylene and propylene. A further improvement in this regard has been the introduction of zeolites. These shape-selective materials can allow an enhancement in selectivity. For e.g. the use of ZSM-5 allows the selective enhancement in propylene production. However, the flip side has been an increase in undesirable dry gas yield. Dry gas refers to the residual low-value gas comprising methane, ethane, ethylene and hydrogen sulfide that remains after condensable liquid hydrocarbons have been extracted. Most refineries have an additional separator for recovery of C4/C3 streams and dry gas forms a component of the cracking which needs to be pumped out of the system. Hence, a selective catalyst that allows enhancement of useful components such as propylene, while decreasing dry gas content is the need of the hour. Further, for using such a selective catalyst, the apparatus and process for Fluid Catalytic Cracking will also have to be modified appropriately.

SUMMARY OF THE INVENTION

In an aspect of the present invention, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition, wherein the zeolite-2 is modified with at least one metal having a weight percentage in the range of 0.1-2.5% with respect to the zeolite-2.

In another aspect of the invention, there is provided a method for preparation of catalyst composition, the method comprising the steps of: (a) contacting at least one metal, a zeolite-2 and at least one solvent to obtain a first mixture; (b) vaporization of the solvent of the first mixture is followed by drying and calcining to obtain a second mixture; (c) mixing the second mixture with a zeolite-1 and a non-zeolitic material to obtain a third mixture; (d) spray drying the third mixture to obtain a fourth mixture; and (e) calcining the fourth mixture to obtain the catalyst composition, wherein the zeolite-2 is modified with at least one metal having a weight percentage in the range of 0.1-2.5% with respect to the zeolite-2.

In yet another aspect of the invention, there is provided a fluid catalytic cracking (FCC) apparatus that includes: (a) a first reactor unit that includes a first riser for cracking the hydrocarbon feedstock; (b) a second reactor unit comprising: i) a second riser for cracking C4 hydrocarbon and crackable recycle streams, and converting methanol stream, to obtain light olefins, the second riser further includes a lower dense riser and upper dilute riser connected in series and the diameter of the lower dense riser is in the range of 1.1 to 2 times the diameter of the upper dilute riser, and length of the lower dense riser is in the range of 10 to 60% of the total length of the second riser; ii) C4 hydrocarbon and methanol feed nozzles connected to the bottom of the lower dense riser; iii) a crackable recycle stream feed nozzle which is connected to the lower dense riser at a height of 15 to 50% above the C4 hydrocarbon feed nozzle or methanol feed nozzle; and iv) a quenching stream feed nozzle which is connected to the upper dilute riser at a height of 0 to 40% above the dense riser; and v) a regenerator in fluid connection with the first and second reactor units for regenerating the spent catalyst received from the first and second reactor units.

In yet another aspect of the invention, there is provided a process for Fluid Catalytic Cracking that includes the following steps: a) feeding a hydrocarbon feedstock stream and a first regenerated catalyst stream into a first riser; b) cracking the hydrocarbon feedstock stream with the first regenerated catalyst stream in the first riser to obtain crackable recycle stream and a first spent catalyst stream; c) feeding C4 hydrocarbons, methanol and second regenerated catalyst streams into the lower dense riser of the second riser; d) cracking the C4 hydrocarbon stream and converting the methanol stream, in the presence of second regenerated catalyst stream in the lower dense riser to obtain light olefins and coked catalyst streams; e) feeding a crackable recycle stream into the lower dense riser of the second riser above the C4 hydrocarbon or methanol stream; f) cracking the crackable recycle stream with the coked catalyst to obtain light olefins and second spent catalyst streams; g) feeding a quenching stream into an upper dilute riser of the second riser; h) quenching the second spent catalyst stream by the quenching stream in the upper dilute riser; and i) conveying the second spent catalyst and light olefins streams through the upper dilute riser, and the gas superficial velocity of the light olefins streams in the upper dilute riser is higher than the gas superficial velocity of the light olefins streams in the lower dense riser.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or steps.

The term "including" is used to mean "including but not limited to", "including" and "including but not limited to" are used interchangeably.

The term "hydrocarbon feedstock" refers to heavy oils left-over from petroleum distillation that can be further refined in a catalytic cracking unit. Examples of hydrocarbon feedstock are hydrotreated vacuum gas oil (HT-VGO), coker gasoline, coker fuel oil (CFO), hydro cracker bottom, vacuum gas oil (VGO), vacuum residue, 25 residue coker oil (RCO), light cracked naphtha (LCN), heavy vacuum gas oil (HVGO).

"Light naphtha" is the fraction having boiling points between 30° C. and 90° C. and consists of molecules with 5-6 carbon atoms.

The term "C4 stream" refers to butanes and butenes.

Butylenes are selected from the group consisting of 1-butene, 2-butene and isobutylene.

The term "Clarified oil (CLO) stream" refers to a heavy aromatic by-product of a refinery's fluid catalytic cracking unit that forms a small part of global fuel oil supply.

The term "modified" refers to the impregnation of said zeolite-2 with elements selected from the group consisting of Ti, Mn, Fe, Zn, and combinations thereof.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 70 wt % to about 95 wt % should be interpreted to include not only the explicitly recited limits of about 70 wt % to about 95 wt %, but also to include sub-ranges, such as 70.05 wt % to 91 wt %, 70 wt % to 85 wt %, and so forth, as well as individual amounts, including fractional amounts, within the specified ranges, such as 70.5 wt %, 81.1 wt %, and 92.9 wt %, for example.

The present disclosure is not to be limited in scope by the specific embodiments described herein, which are intended for the purposes of exemplification only. Functionally equivalent products, compositions, and methods are clearly within scope of the disclosure, as described herein.

To tackle the issue of low selectivity in the fluid catalyzed cracking process, the present disclosure provides a superior metal-impregnated zeolite based catalyst, an improved fluid catalytic cracking (FCC) apparatus and process. The said catalyst and FCC apparatus reveals enhanced propylene content and low dry gas yield. Accordingly, in an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition, wherein the zeolite-2 is modified with at least one metal having a weight percentage in the range of 0.1-2.5% with respect to the zeolite-2. In another embodiment of the present disclosure, there is provided a catalyst composition comprising: a) a non-zeolitic material having a weight percentage in the range of 78-84% with respect to the catalyst composition; b) a zeolite-1 having a weight percentage in the range of 5-16% with respect to the catalyst composition; and c) a zeolite-2 having a weight percentage in the range of 4-10% with respect to the catalyst composition, wherein the zeolite-2 is modified with at least one metal having a weight percentage in the range of 0.5-2.0% with respect to the zeolite-2. In yet another embodiment of the present disclosure, there is provided a catalyst composition comprising: a) a non-zeolitic material having a weight percentage in the range of 80% with respect to the catalyst composition; b) a zeolite-1 having a weight percentage in the range of 12% with respect to the catalyst composition; and c) a zeolite-2 having a weight percentage in the range of 8% with respect to the catalyst composition, wherein the zeolite-2 is modified with at least one metal having a weight percentage of 2.0% with respect to the zeolite-2.

In an embodiment of the present disclosure, there is provided a catalyst composition as described herein, wherein the non-zeolitic material, zeolite-1 and zeolite-2 can be formed separately and blended or they can be mixed together to obtain a slurry, which is spray dried to obtain the catalyst.

In an embodiment of the present disclosure, there is provided a catalyst composition as described herein, wherein the zeolite-1 is selected from the group consisting of ultra-stable Y (USY), rare earth exchanged ultra-stable Y (REUSY), beta, and combinations thereof. In another embodiment of the present disclosure, the zeolite-1 is USY.

In an embodiment of the present disclosure, there is provided a catalyst composition as described herein, wherein the zeolite-2 is selected from the group consisting of ZSM-5, ZSM-11, ZSM-22, SAPO-11, and combinations thereof. In another embodiment of the present disclosure, the zeolite-2 is ZSM-5.

In an embodiment of the present disclosure, there is provided a catalyst composition as described herein, wherein the zeolite-1 has a pore size in the range of 7-8 Å. In another embodiment of the present disclosure, the zeolite-1 has a pore size of 7 Å.

In an embodiment of the present disclosure, there is provided a catalyst composition as described herein, wherein the zeolite-2 has a pore size in the range of 5-6 Å. In another embodiment of the present disclosure, the zeolite-2 has a pore size of 5 Å.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition and selected from the group consisting of ultra-stable Y (USY), rare earth exchanged ultra-stable Y (REUSY), beta, and combinations thereof; and c) a zeolite-2 having a weight percentage in the range of 2-12% with respect to the catalyst composition and selected from the group consisting of ZSM-5, ZSM-11, ZSM-22, SAPO-11, and combinations thereof, wherein the zeolite-2 is modified with at least one metal having a weight percentage in the range of 0.1-2.5% with respect to the zeolite-2.

In an embodiment of the present disclosure, there is provided a catalyst composition comprising: a) a non-zeolitic material having weight percentage in the range of 76-86% with respect to the catalyst composition; b) a zeolite-1 having a weight percentage in the range of 3-18% with respect to the catalyst composition and a pore size in the range of 7-8 Å; and c) a zeolite-2 having a weight percentage in the range of 2-12% with respect to the catalyst composition, wherein the zeolite-2 is modified with at least one metal having a weight percentage in the range of 0.1-2.5% with respect to the zeolite-2.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition and a pore size in the range of 5-6 Å, wherein the zeolite-2 is modified with at least one metal having a weight percentage in the range of 0.1-2.5% with respect to the zeolite-2.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition and a pore size in the range of 7-8 Å; and c) a zeolite-2 having a weight percentage in the range of 2-12% with respect to the catalyst composition and a pore size in the range of 5-6 Å, wherein the zeolite-2 is modified with at least one metal having a weight percentage in the range of 0.1-2.5% with respect to the zeolite-2.

In an embodiment of the present disclosure, there is provided a catalyst composition as described herein, wherein the zeolite-2 has a Si/Al ratio in the range of 30-500. In another embodiment of the present disclosure, the zeolite-2 has a Si/Al ratio in the range of 30-100. In yet another embodiment of the present disclosure, the zeolite-2 has a Si/Al ratio of 80.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition and having a Si/Al ratio in the range of 30-500, wherein the zeolite-2 is modified with at least one metal having a weight percentage in the range of 0.1-2.5% with respect to the zeolite-2.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition and having a Si/Al ratio in the range of 30-100, wherein the zeolite-2 is modified with at least one metal having a weight percentage in the range of 0.1-2.5% with respect to the zeolite-2.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition and having a Si/Al ratio in the range of 80, wherein the zeolite-2 is modified with at least one metal having a weight percentage in the range of 0.1-2.5% with respect to the zeolite-2.

In one embodiment of the present disclosure, there is provided a catalyst composition as described herein, wherein the non-zeolitic material is a combination of a) active material selected from the group consisting of silica, alumina, and combinations thereof; and b) inactive material selected from the group consisting of silica-alumina, kaolin clay, montmorillonite clay, bentonites clay, halloysite clay, and combinations thereof. In another embodiment of the present disclosure, the non-zeolitic material is a combination of a) silica; and b) silica-alumina. In yet another embodiment of the present disclosure, the non-zeolitic material is a combination of a) alumina; and b) kaolin clay.

In an embodiment of the present disclosure, there is provided a catalyst composition as described herein, wherein the inactive material further comprises: a) at least one binder selected from the group consisting of silica, silica-alumina, and combinations thereof; and b) at least one filler selected from the group consisting of kaolin clay, montmorillonite clay, bentonites clay, halloysite clay, and combinations thereof.

In one embodiment of the present disclosure, there is provided a catalyst composition as described herein, wherein the active to inactive material weight ratio is in the range of 1:2-1:2.5. In another embodiment of the present disclosure, the active to inactive material weight ratio is in the range of 1:2.1-1:2.5. In yet another embodiment of the present disclosure, the active to inactive material weight ratio is in the range of 1:2-1:2.4. In another embodiment of the present disclosure, the active to inactive material weight ratio is 1:2.2.

In an embodiment of the present disclosure, there is provided a catalyst composition comprising: a) a non-zeolitic material having a weight percentage in the range of 76-86% with respect to the catalyst composition is a combination of i) active material selected from the group consisting of silica, alumina, and combinations thereof; and ii) inactive material selected from the group consisting of silica-alumina, kaolin clay, montmorillonite clay, bentonites clay, halloysite clay, and combinations thereof; b) a zeolite-1 having a weight percentage in the range of 3-18% with respect to the catalyst composition; and c) a zeolite-2 having a weight percentage in the range of 2-12% with respect to the catalyst composition, wherein the zeolite-2 is modified with at least one metal having a weight percentage in the range of 0.1-2.5% with respect to the zeolite-2 and the active to inactive material weight ratio is in the range of 1:2-1:2.5.

In an embodiment of the present disclosure, there is provided a catalyst composition comprising: a) a non-zeolitic material having a weight percentage in the range of 76-86% with respect to the catalyst composition is a combination of i) active material selected from the group consisting of silica, alumina, and combinations thereof; and ii) inactive material selected from the group consisting of silica-alumina, kaolin clay, montmorillonite clay, bentonites clay, halloysite clay, and combinations thereof; b) a zeolite-1 having a weight percentage in the range of 3-18% with respect to the catalyst composition is selected from the group consisting of ultra-stable Y (USY), rare earth exchanged ultra-stable Y (REUSY), beta, and combinations thereof; and c) a zeolite-2 having a weight percentage in the range of 2-12% with respect to the catalyst composition is selected from the group consisting of ZSM-5, ZSM-11, ZSM-22, SAPO-11, and combinations thereof, wherein the zeolite-2 is modified with at least one metal having a weight percentage in the range of 0.1-2.5% with respect to the zeolite-2 and the active to inactive material weight ratio is in the range of 1:2-1:2.5.

In one embodiment of the present disclosure, there is provided a catalyst composition as described herein, wherein the zeolite-2 is modified with at least one metal selected from the group consisting of Ti, Mn, Fe, Zn, and combinations thereof. In another embodiment of the present disclosure, the zeolite-2 is modified with Mn. In another embodiment of the present disclosure, the zeolite-2 is modified with Ti, Mn, Fe and Zn.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition, wherein the zeolite-2 is modified with at least one metal selected from the group consisting of Ti, Mn, Fe, Zn, and combinations thereof and the metal has a weight percentage in the range of 0.1-2.5% with respect to the zeolite-2.

In an embodiment of the present disclosure, there is provided a catalyst composition comprising: a) a non-zeolitic material having a weight percentage in the range of 76-86% with respect to the catalyst composition is a combination of i) active material selected from the group consisting of silica, alumina, and combinations thereof; and ii) inactive material selected from the group consisting of silica-alumina, kaolin clay, montmorillonite clay, bentonites clay, halloysite clay, and combinations thereof; b) a zeolite-1 having a weight percentage in the range of 3-18% with respect to the catalyst composition is selected from the group consisting of ultra-stable Y (USY), rare earth exchanged ultra-stable Y (REUSY), beta, and combinations thereof; and c) a zeolite-2 having a weight percentage in the range of 2-12% with respect to the catalyst composition is selected from the group consisting of ZSM-5, ZSM-11, ZSM-22, SAPO-11, and combinations thereof, wherein the zeolite-2 is modified with at least one metal selected from the group consisting of Ti, Mn, Fe, Zn, and combinations thereof and the metal has a weight percentage in the range of 0.1-2.5% with respect to the zeolite-2.

In one embodiment of the present disclosure, there is provided a catalyst composition as described herein, wherein the zeolite-2 is modified with 0.5 wt % each of Ti, Mn, Fe, and Zn, with respect to the zeolite-2.

In an embodiment of the present disclosure, there is provided a catalyst composition comprising: a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition, wherein the zeolite-2 is modified with 0.5 wt % each of Ti, Mn, Fe, and Zn, with respect to the zeolite-2.

In an embodiment of the present disclosure, there is provided a catalyst composition comprising: a) a non-zeolitic material having a weight percentage in the range of 76-86% with respect to the catalyst composition is a combination of i) active material selected from the group consisting of silica, alumina, and combinations thereof; and ii) inactive material selected from the group consisting of silica-alumina, kaolin clay, montmorillonite clay, bentonites clay, halloysite clay, and combinations thereof; b) a zeolite-1 having a weight percentage in the range of 3-18% with respect to the catalyst composition is selected from the group consisting of ultra-stable Y (USY), rare earth exchanged ultra-stable Y (REUSY), beta, and combinations thereof; and c) a zeolite-2 having a weight percentage in the range of 2-12% with respect to the catalyst composition is selected from the group consisting of ZSM-5, ZSM-11, ZSM-22, SAPO-11, and combinations thereof, wherein the zeolite-2 is modified with 0.5 wt % each of Ti, Mn, Fe, and Zn, with respect to the zeolite-2.

In an embodiment of the present disclosure, there is provided a method for preparation of catalyst composition, the method comprising the steps of: (a) contacting at least one metal, a zeolite-2 and at least one solvent to obtain a first mixture; (b) vaporization of the solvent of the first mixture is followed by drying and calcining to obtain a second mixture; (c) mixing the second mixture with a zeolite-1 and a non-zeolitic material to obtain a third mixture; (d) spray drying the third mixture to obtain a fourth mixture; and (e) calcining the fourth mixture to obtain the catalyst composition, wherein the zeolite-2 is modified with at least one metal having a weight percentage in the range of 0.1-2.5% with respect to the zeolite-2.

In an embodiment of the present disclosure, there is provided a method as described herein, wherein contacting at least one metal, a zeolite-2 and at least one solvent to obtain a first mixture is carried out by stirring at a temperature in the range of 20-35° C. for a period in the range of 0.5-2.0 hours, at a stirring speed in the range of 200-700 rpm. In another embodiment of the present disclosure, contacting at least one metal, a zeolite-2 and at least one solvent to obtain a first mixture is carried out by stirring at a temperature in the range of 22-33° C. for a period in the range of 0.7-1.8 hours, at a stirring speed in the range of 220-680 rpm. In yet another embodiment of the present disclosure, contacting at least one metal, a zeolite-2 and at least one solvent to obtain a first mixture is carried out by stirring at a temperature of 25° C. for a period of 2.0 hours, at a stirring speed of 400 rpm.

In an embodiment of the present disclosure, there is provided a method as described herein, wherein vaporization of the solvent of the first mixture is carried out at a temperature in the range of 60-70° C. under reduced pressure followed by drying at a temperature in the range of 100-120° C. for a period in the range of 10-14 hours and calcining at a temperature in the range of 500-600° C. for a period in the range of 1.0-2.0 hours to obtain the second mixture. In another embodiment of the present disclosure, vaporization of the solvent of the first mixture is carried out at a temperature in the range of 62-68° C. under reduced pressure followed by drying at a temperature in the range of 105-115° C. for a period in the range of 11-13 hours and calcining at a temperature in the range of 520-580° C. for a period in the range of 1.2-1.8 hours to obtain the second mixture. In yet another embodiment of the present disclosure, vaporization of the solvent of the first mixture is carried out at a temperature of 65° C. under reduced pressure followed by drying at a temperature of 110° C. for a period in the range of 12 hours and calcining at a temperature of 550° C. for a period of 2.0 hours to obtain the second mixture. In yet another embodiment of the present disclosure, the vaporization is carried out using a rotary evaporator.

In an embodiment of the present disclosure, there is provided a method as described herein, wherein the second mixture is mixed with a zeolite-1 and a non-zeolitic material to obtain a third mixture. In another embodiment of the present disclosure, mixing the second mixture with a zeolite-1 and a non-zeolitic material to obtain a third mixture is carried out at a temperature in the range of 20-35° C.

In an embodiment of the present disclosure, there is provided a method as described herein, wherein spray drying the third mixture to obtain a fourth mixture in form of micro-spheres is carried out at an inlet temperature in the range of 300-400° C. and an outlet temperature in the range of 100-200° C. In another embodiment of the present disclosure, spray drying the third mixture to obtain a fourth mixture in form of micro-spheres is carried out at an inlet temperature in the range of 320-380° C. and an outlet temperature in the range of 120-180° C. In yet another embodiment of the present disclosure, spray drying the third mixture to obtain a fourth mixture in form of micro-spheres is carried out at an inlet temperature of 350° C. and an outlet temperature of 150° C.

In an embodiment of the present disclosure, there is provided a method as described herein, wherein calcining the fourth mixture is carried out at a temperature in the range of 500-600° C. for a period in the range of 1.0-2.0 hours to obtain the catalyst composition. In another embodiment of the present disclosure, calcining the fourth mixture is carried out at a temperature in the range of 520-580° C. for a period in the range of 1.2-1.8 hours to obtain the catalyst composition. In yet another embodiment of the present disclosure, calcining the fourth mixture is carried out at a temperature of 550° C. for a period in the range of 2.0 hours to obtain the catalyst composition.

In an embodiment of the present disclosure, there is provided a method comprising the steps of: (a) contacting at least one metal, a zeolite-2 and at least one solvent to obtain a first mixture is carried out by stirring at a temperature in the range of 20-35° C. for a period in the range of 0.5-2.0 hours, at a stirring speed in the range of 200-700 rpm; (b) vaporization of the solvent of the first mixture is carried out at a temperature in the range of 60-70° C. under reduced pressure followed by drying at a temperature in the range of 100-120° C. for a period in the range of 10-14 hours and calcining at a temperature in the range of 500-600° C. for a period in the range of 1.0-2.0 hours to obtain the second mixture; (c) mixing the second mixture with a zeolite-1 and a non-zeolitic material to obtain a third mixture; (d) spray drying the third mixture to obtain a fourth mixture in form of micro-spheres is carried out at an inlet temperature in the range of 300-400° C. and an outlet temperature in the range of 100-200° C.; and (e) calcining the fourth mixture is carried out at a temperature in the range of 500-600° C. for a period in the range of 1.0-2.0 hours to obtain the catalyst composition, wherein the zeolite-2 is modified with at least one metal having a weight percentage in the range of 0.1-2.5% with respect to the zeolite-2.

In an embodiment of the present disclosure, there is provided a method comprising the steps of: (a) contacting at least one metal, a zeolite-2 and at least one solvent to obtain a first mixture is carried out by stirring at a temperature of 25° C. for a period of 1.5 hours, at a stirring speed of 360 rpm; (b) vaporization of the solvent of the first mixture is carried out at a temperature of 65° C. under reduced pressure followed by drying at a temperature of 110° C. for a period of 12 hours and calcining at a temperature of 550° C. for a period of 1.5 hours to obtain the second mixture; (c) mixing the second mixture with a zeolite-1 and a non-zeolitic material to obtain a third mixture; (d) spray drying the third mixture to obtain a fourth mixture in form of micro-spheres is carried out at an inlet temperature of 350° C. and an outlet temperature of 150° C.; and (e) calcining the fourth mixture is carried out at a temperature of 550° C. for a period of 1.5 hours to obtain the catalyst composition, wherein the zeolite-2 is modified with at least one metal having a weight percentage in the range of 0.1-2.5% with respect to the zeolite-2.

In an embodiment of the present disclosure, there is provided a method as described herein, wherein a) the zeolite-1 has a pore size in the range of 7-8 Å and is selected from the group consisting of ultra-stable Y (USY), rare earth exchanged ultra-stable Y (REUSY), beta, combinations thereof; and b) the zeolite-2 has a pore size in the range of 5-6 Å and is selected from the group consisting of ZSM-5, ZSM-11, ZSM-22, SAPO-11, and combinations thereof, wherein the zeolite-2 has a Si/Al ratio in the range of 30-500.

In an embodiment of the present disclosure, there is provided a method for preparation of catalyst composition, the method comprising the steps of: (a) contacting at least one metal, a zeolite-2 and at least one solvent to obtain a first mixture; (b) vaporization of the solvent of the first mixture is followed by drying and calcining to obtain a second mixture; (c) mixing the second mixture with a zeolite-1 and a non-zeolitic material to obtain a third mixture; (d) spray drying the third mixture to obtain a fourth mixture; and (e) calcining the fourth mixture to obtain the catalyst composition, wherein the zeolite-2 is modified with at least one metal having a weight percentage in the range of 0.1-2.5% with respect to the zeolite-2 and a) the zeolite-1 has a pore size in the range of 7-8 Å and is selected from the group consisting of ultra-stable Y (USY), rare earth exchanged ultra-stable Y (REUSY), beta, combinations thereof; and b) the zeolite-2 has a pore size in the range of 5-6 Å and is selected from the group consisting of ZSM-5, ZSM-11, ZSM-22, SAPO-11, and combinations thereof, wherein the zeolite-2 has a Si/Al ratio in the range of 30-500.

In an embodiment of the present disclosure, there is provided a method comprising the steps of: (a) contacting at least one metal, a zeolite-2 and at least one solvent to obtain a first mixture is carried out by stirring at a temperature in the range of 20-35° C. for a period in the range of 0.5-2.0 hours, at a stirring speed in the range of 200-700 rpm; (b) vaporization of the solvent of the first mixture is carried out at a temperature in the range of 60-70° C. under reduced pressure followed by drying at a temperature in the range of 100-120° C. for a period in the range of 10-14 hours and calcining at a temperature in the range of 500-600° C. for a period in the range of 1.0-2.0 hours to obtain the second mixture; (c) mixing the second mixture with a zeolite-1 and a non-zeolitic material to obtain a third mixture; (d) spray drying the third mixture to obtain a fourth mixture in form of micro-spheres is carried out at an inlet temperature in the range of 300-400° C. and an outlet temperature in the range of 100-200° C.; and (e) calcining the fourth mixture is carried out at a temperature in the range of 500-600° C. for a period in the range of 1.0-2.0 hours to obtain the catalyst composition, wherein the zeolite-2 is modified with at least one metal having a weight percentage in the range of 0.1-2.5% with respect to the zeolite-2 and a) the zeolite-1 has a pore size in the range of 7-8 Å and is selected from the group consisting of ultra-stable Y (USY), rare earth exchanged ultra-stable Y (REUSY), beta, combinations thereof; and b) the zeolite-2 has a pore size in the range of 5-6 Å and is selected from the group consisting of ZSM-5, ZSM-11, ZSM-22, SAPO-11, and combinations thereof, wherein the zeolite-2 has a Si/Al ratio in the range of 30-500.

In an embodiment of the present disclosure, there is provided a method as described herein, wherein the non-zeolitic material is a combination of a) active material selected from the group consisting of silica, alumina, and combinations thereof; and b) inactive material selected from the group consisting of silica-alumina, kaolin clay, montmorillonite clay, bentonites clay, halloysite clay, and combinations thereof, wherein the active to inactive material weight ratio is in the range of 1:2-1:2.5.

In an embodiment of the present disclosure, there is provided a method for preparation of catalyst composition, the method comprising the steps of: (a) contacting at least one metal, a zeolite-2 and at least one solvent to obtain a first mixture; (b) vaporization of the solvent of the first mixture is followed by drying and calcining to obtain a second mixture; (c) mixing the second mixture with a zeolite-1 and a non-zeolitic material to obtain a third mixture; (d) spray drying the third mixture to obtain a fourth mixture; and (e) calcining the fourth mixture to obtain the catalyst composition, wherein the zeolite-2 is modified with at least one metal having a weight percentage in the range of 0.1-2.5% with respect to the zeolite-2 and the non-zeolitic material is a combination of a) active material selected from the group consisting of silica, alumina, and combinations thereof; and b) inactive material selected from the group consisting of silica-alumina, kaolin clay, montmorillonite clay, bentonites clay, halloysite clay, and combinations thereof, wherein the active to inactive material weight ratio is in the range of 1:2-1:2.5.

In an embodiment of the present disclosure, there is provided a method comprising the steps of: (a) contacting at least one metal, a zeolite-2 and at least one solvent to obtain a first mixture is carried out by stirring at a temperature in the range of 20-35° C. for a period in the range of 0.5-2.0 hours, at a stirring speed in the range of 200-700 rpm; (b) vaporization of the solvent of the first mixture is carried out at a temperature in the range of 60-70° C. under reduced pressure followed by drying at a temperature in the range of 100-120° C. for a period in the range of 10-14 hours and calcining at a temperature in the range of 500-600° C. for a period in the range of 1.0-2.0 hours to obtain the second mixture; (c) mixing the second mixture with a zeolite-1 and a non-zeolitic material to obtain a third mixture; (d) spray drying the third mixture to obtain a fourth mixture in form of micro-spheres is carried out at an inlet temperature in the range of 300-400° C. and an outlet temperature in the range of 100-200° C.; and (e) calcining the fourth mixture is carried out at a temperature in the range of 500-600° C. for a period in the range of 1.0-2.0 hours to obtain the catalyst composition, wherein the zeolite-2 is modified with at least one metal having a weight percentage in the range of 0.1-2.5% with respect to the zeolite-2 and the non-zeolitic material is a combination of a) active material selected from the group consisting of silica, alumina, and combinations thereof; and b) inactive material selected from the group consisting of silica-alumina, kaolin clay, montmorillonite clay, bentonites clay, halloysite clay, and combinations thereof, wherein the active to inactive material weight ratio is in the range of 1:2-1:2.5.

In an embodiment of the present disclosure, there is provided a method as described herein, wherein the zeolite-2 is modified with 0.5 wt % each of Ti, Mn, Fe, and Zn, with respect to the zeolite-2.

In an embodiment of the present disclosure, there is provided a method for preparation of catalyst composition, the method comprising the steps of: (a) contacting at least one metal, a zeolite-2 and at least one solvent to obtain a first mixture; (b) vaporization of the solvent of the first mixture is followed by drying and calcining to obtain a second mixture; (c) mixing the second mixture with a zeolite-1 and a non-zeolitic material to obtain a third mixture; (d) spray drying the third mixture to obtain a fourth mixture; and (e) calcining the fourth mixture to obtain the catalyst composition, wherein the zeolite-2 is modified with 0.5 wt % each of Ti, Mn, Fe, and Zn, with respect to the zeolite-2.

In an embodiment of the present disclosure, there is provided a method comprising the steps of: (a) contacting at least one metal, a zeolite-2 and at least one solvent to obtain a first mixture is carried out by stirring at a temperature in the range of 20-35° C. for a period in the range of 0.5-2.0 hours, at a stirring speed in the range of 200-700 rpm; (b) vaporization of the solvent of the first mixture is carried out at a temperature in the range of 60-70° C. under reduced pressure followed by drying at a temperature in the range of 100-120° C. for a period in the range of 10-14 hours and calcining at a temperature in the range of 500-600° C. for a period in the range of 1.0-2.0 hours to obtain the second mixture; (c) mixing the second mixture with a zeolite-1 and a non-zeolitic material to obtain a third mixture; (d) spray drying the third mixture to obtain a fourth mixture in form of micro-spheres is carried out at an inlet temperature in the range of 300-400° C. and an outlet temperature in the range of 100-200° C.; and (e) calcining the fourth mixture is carried out at a temperature in the range of 500-600° C. for a period in the range of 1.0-2.0 hours to obtain the catalyst composition, wherein the zeolite-2 is modified with 0.5 wt % each of Ti, Mn, Fe, and Zn, with respect to the zeolite-2.

In an embodiment of the present disclosure, there is provided a catalyst composition as described herein, wherein the catalyst can be used in cracking a hydrocarbon feedstock to obtain light olefins. In another embodiment of the present disclosure, the catalyst can be used in oligomerization of $C_{1-4}$ hydrocarbon to obtain light olefins. $C_1$ hydrocarbon may be methanol and $C_4$ hydrocarbon may be isobutylene. In yet another embodiment of the present disclosure, the catalyst can be used in oligomerization of methanol to obtain light olefins. In another embodiment of the present disclosure, the catalyst can be used in oligomerization of isobutylene to obtain light olefins.

In an embodiment of the present disclosure, there is provided a process for the fluid catalytic cracking in the presence of the catalyst composition as claimed in claim 1, the process comprising the steps of: a) cracking the hydrocarbon feedstock at a predetermined temperature in the range of 550-600° C. to obtain a crackable recycle stream; and b) cracking the crackable recycle stream with a predetermined WHSV of 0-50 hr$^{-1}$ and/or C4 hydrocarbon stream with a predetermined WHSV of 0-20 hr$^{-1}$, at a predetermined temperature in the range of 600-650° C. to obtain light olefins.

In an embodiment of the present disclosure, there is provided a process for oligomerization of methanol in the presence of the catalyst composition as claimed in claim 1, the process comprising the step of: a) converting the methanol stream with a predetermined WHSV of 0-20 hr$^{-1}$ at a predetermined temperature in the range of 600-650° C. to obtain light olefins.

The above discussed catalyst compositions can be used for fluid catalytic cracking in various implementations. The following description describes example fluid catalytic cracking (FCC) apparatuses in detail. While the aspects of an FCC apparatus can be implemented in any number of different applications and configurations, the FCC apparatus of the present subject matter is described in the context of the following exemplary embodiments.

Figure 1:
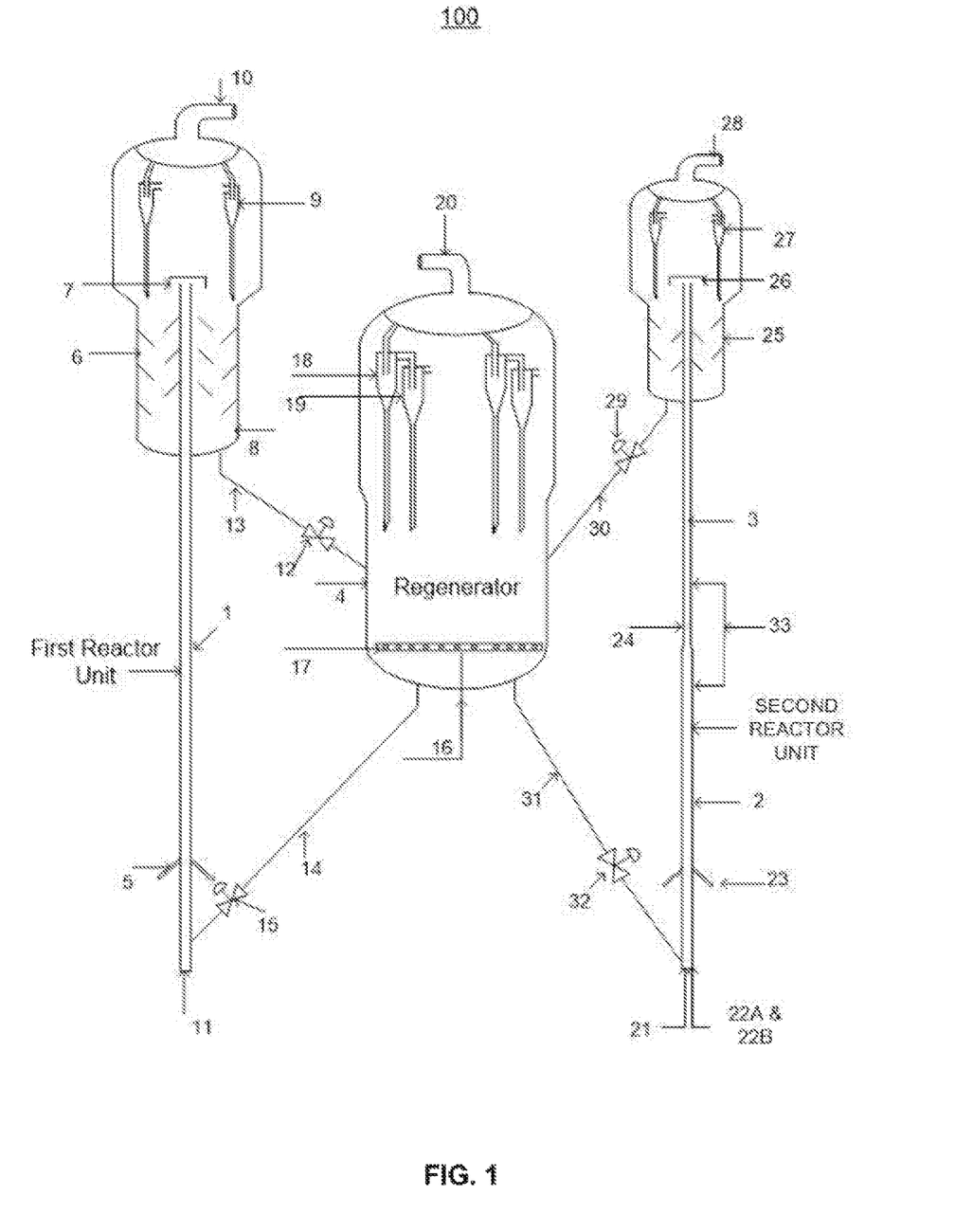
FIG. 1 illustrates an apparatus for fluid catalytic cracking of a hydrocarbon feedstock, in accordance with an implementation of the present subject matter.

FIG. 1 illustrates a FCC apparatus, herein referred to as an apparatus 100, in accordance with an embodiment of the present subject matter. The apparatus 100 includes a first reactor unit, a second reactor unit, and a regenerator 4, the first reactor unit and the second reactor unit are in fluid connection with the regenerator 4. The first reactor unit may comprise an up flow, down flow or inclined flow riser or turbulent bed, or a dense bed reactor.

In an example, the first reactor unit comprises an up flow riser, and in particular a first riser 1 is provided that terminates in a first riser termination device 7 located at the top of the first riser 1. In said example, a first regenerated catalyst is introduced into the first riser 1 through a first regenerated catalyst standpipe 14 and by means of a first regenerated catalyst slide valve 15 which are connected to the bottom of the first reactor unit. A steam feed nozzle 11 for injecting lift steam into the first riser 1 and is connected to the bottom of the first riser 1. Further, in this example, the hydrocarbon feedstock which is preheated is fed to the first riser 1 through hydrocarbon feedstock feed nozzles 5, which are located at the bottom of the first riser 1 and above the steam feed nozzle 11. The hydrocarbon feedstock may be selected from vacuum gas oil (VGO), reduced crude oil (RCO), crude oil, light naphtha, clarified oil (CLO), and combinations thereof. In operation, the first regenerated catalyst is lifted by the lift steam in an acceleration zone, till the hydrocarbon feedstock feed nozzle 5, where it comes in contact with the hydrocarbon feedstock and causes cracking to produce a crackable recycle stream and first spent catalyst stream. In an example, the first reactor unit is maintained under a first set of operating conditions to allow the cracking process to occur. The first set of operating conditions include: a reactor temperature in a range of 550 to 600° C., catalyst to hydrocarbon feedstock ratio in a range of 10 to 20 wt/wt, a riser residence time in a range of 1 to 4 seconds, and a reactor pressure in a range of 0.5 to 2 kg/cm$^2$.

In an example, the first spent catalyst and the crackable recycle stream are separated in the first riser termination device 7 and first reactor cyclones 9. In an example, the first riser termination device 7 terminates in the dense bed portion or above the dense bed portion of the first reactor unit at the top. The crackable recycle stream exits through a reactor vapor line 10. The first spent catalyst along with any hydrocarbon trapped in it is stripped in a first stripper 6 by a stripping stream. The first stripper 6 section also has a provision 8 for recycle stream. The first spent catalyst is then fed into the regenerator 4 through a first spent catalyst standpipe 13 by means of a first spent catalyst slide valve 12 for regeneration of the first spent catalyst to produce first regenerated catalyst.

Further, a second regenerated catalyst flows from the regenerator 4 to the second reactor unit through a second regenerated catalyst standpipe 31 and by means of a second regenerated catalyst slide valve 32 connected to the bottom of the second reactor unit. The second reactor unit may either be in series or parallel to the first reactor unit. Further, the second reactor unit may comprise an up flow, down flow or inclined flow riser or turbulent bed, or a dense bed reactor.

In an example, the second reactor unit is connected in series with the first reactor unit and further, the second reactor unit comprises a second riser 33 that includes lower dense riser 2 and an upper dilute riser 3 which are connected in series. The upper dilute riser 3 terminates in a second riser termination device 26. In the said example, the diameter of the lower dense riser 2 is in the range of 1.1 to 2 times the diameter of the upper dilute riser 3 and length of the lower dense riser 2 is in the range of 10 to 60% of the total length of the second riser 33. The bottom of the second reactor unit is provided with feed nozzles for injecting C4 hydrocarbon 22A, methanol 22B and lift steam 21. As is understood, C4 hydrocarbon are products of the cracking process and typically include butanes and or butylenes. The C4 hydrocarbon stream is cracked in the presence of the second regenerated catalyst and the methanol stream is converted in the presence of the second regenerated catalyst in the lower dense riser 2, to obtain light olefins and coked catalyst streams. The coked catalyst includes coke in a range of 0-0.1% by weight, thus providing improved selectivity of light olefins during the cracking in the lower dense riser 2. The light olefins produced in apparatus 100 include ethylene, propylene and/or butylene.

Further, in the said example the crackable recycle stream e.g. Light Cracked Naphtha (LCN) is injected through crackable recycle stream nozzles 23. The crackable recycle stream nozzles 23 are connected to the lower dense riser 2 at a height in a range of 15 to 50% above the C4 hydrocarbon and methanol feed nozzles (22A, 22B). The crackable recycle stream and C4 hydrocarbon stream are cracked and the methanol stream converted, in the presence of the coked catalyst to obtain light olefins, and second spent catalyst streams. The crackable recycle stream includes light cracked naphtha (LCN), light cycle oil (LCO), and/or CLO. In an example, the second reactor unit is operated under a second set of operating conditions that include: reactor temperature in a range of 600-700° C., reactor pressure in a range of 0.5 to 2.0 kg/cm², a predetermined steam to hydrocarbon feedstock ratio of 0 to 5% by weight, cracking the C4 hydrocarbon stream and converting the methanol stream at Weight Hourly Space Velocity (WHSV) in a range of 0-20 hr$^{-1}$ and total riser residence time of 3-6 seconds; cracking the crackable recycle stream in the lower dense riser 2 at a predetermined WHSV in the range of 0-50 hr$^{-1}$, and a riser residence time of lower dense riser 2 in the range of 2.5-5 seconds.

In the said example, a quenching stream is injected through a quenching stream feed nozzle 24 into the upper dilute riser 3 at a height in the range of 0 to 40% above the lower dense riser 2. The second spent catalyst is quenched by the quenching stream in the upper dilute riser 3. The quenching stream blocks the pores of the second spent catalyst by depositing aromatic molecules and thereby suppressing secondary cracking reactions in the upper dilute riser 3. The quenching stream includes aromatic rich stream such as Clarified Oil (CLO) and Light Cycle Oil (LCO). Thus, cracking reaction happens only in lower dense riser 2 and secondary cracking reactions are avoided in upper dilute riser 3 by the quenching stream.

Further, in the said example the second spent catalyst and light olefins streams are conveyed through the upper dilute riser 3 with a gas superficial velocity (GSV) of light olefins stream in the upper dilute riser 3 higher than the GSV of the light olefins stream in the lower dense riser 2. The entrained second spent catalyst is separated from the olefin stream in a second riser termination device 26 and the second spent catalyst is separated from the light olefins stream in second reactor cyclones 27. The light olefins stream exit through the second reactor vapor exit line 28. The second spent catalyst is stripped of hydrocarbon in a second stripper 25 by a stripping steam and the stripped spent catalyst flows to the regenerator 4 through the second spent catalyst standpipe 30 by means of a second spent catalyst slide valve 29. The second stripper section 25 has stripper internals, the stripper internals are baffle like structures, and where the spent catalyst uniformly flows over them to enhance the mass transfer efficiency of stripper 25.

In an example, the first and second spent catalysts are regenerated in the regenerator 4. The regenerator 4 includes an air controller 16 to regulate the gas flow to an air distributor 17 to combust at least a portion of coke deposited on the first and second spent catalysts for regeneration. The first and second spent catalysts entrained along with the flue gas are separated in primary cyclones 18 and secondary cyclones 19 and the flue gas exits from a flue gas exit line 20. The first and second regenerated catalyst from the regenerator 4 enters the first and second reactor unit bottoms through the first and second regenerated catalyst standpipes 14, 31 by the means of first and second regenerated catalyst slide valves 15 & 32 respectively. In the said example, the regenerator 4 is operated at a temperature in a range of 600-750° C.

In an example, a fresh catalyst is introduced (not shown in the apparatus 100) into the regenerator 4 as make up catalyst, since there is a loss of catalyst from the regenerator 4 and first and second reactor units. The addition rate of the fresh catalyst varies and depends on the loss of catalyst. In the said example, for a loss of catalyst at the rate of 1 to 1.5 tons/day, the make up catalyst is added at a rate of 2 tons/day and withdrawn at a rate of 0.5 to 1 tons/day. The addition and withdrawal of catalyst is done to maintain the activity and inventory level in the regenerator 4. Further, the regenerator 4 provides the first and second stream of regenerated catalyst to the first reactor unit and second reactor unit respectively. The fresh catalyst/regenerated catalyst composition comprises a) a non-zeolitic material having a weight percentage in the range of 76-86% with respect to the catalyst composition; b) a zeolite-1 having a weight percentage in the range of 3-18% with respect to the catalyst composition; and c) a zeolite-2 having a weight percentage in the range of 2-12% with respect to the catalyst composition, further the zeolite-2 is modified with at least one metal having a weight percentage in the range of 0.1-2.5% with respect to the zeolite-2. It will be understood that the fresh catalyst/regenerated catalyst composition that may be used also includes the various embodiments as described earlier in the present application.

As is understood, the various embodiments of the catalyst compositions described earlier allow for: cracking of hydrocarbon feedstock to form a crackable recycle stream, cracking of C4 hydrocarbons to form light olefins, and conversion of methanol into light olefins. Further, as a result of the cracking of C4 hydrocarbons and conversion of methanol, coked catalyst is formed, which allows for cracking of the crackable recycle stream to also form light olefins. Thus, the apparatus as described above facilitates in the efficient production of light olefins from hydrocarbon feedstock without generation of dry gas using the catalyst compositions of the present subject matter.

Figure 2:
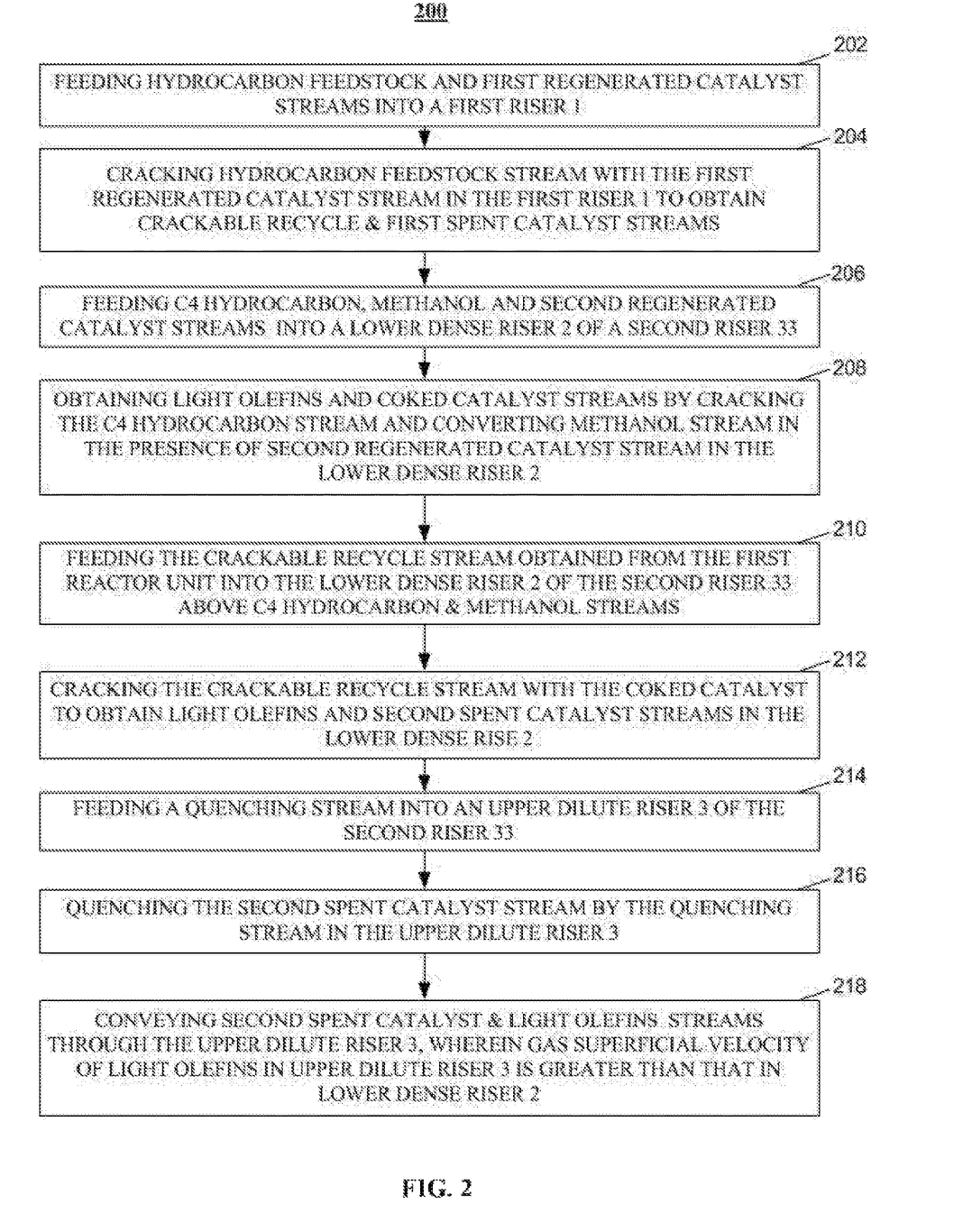
FIG. 2 illustrates a process for the fluid catalytic cracking of hydrocarbon feedstock, in accordance with an implementation of the present subject matter.

FIG. 2 illustrates a process 200 for Fluid Catalytic Cracking (FCC) of the hydrocarbon feedstock to obtain light olefins using the apparatus 100 and the catalyst compositions as described earlier. It will be understood that process 200 is not limited to the sequence of steps described therein and some of the blocks of process 200 may be performed sequentially or in a different order without departing from the disclosed subject matter.

At block 202, a hydrocarbon feedstock stream is fed along with a first regenerated catalyst stream into a first riser 1. At block 204, the hydrocarbon feedstock is cracked in the presence of first regenerated catalyst stream to obtain crackable recycle stream. Such a cracking process is performed under first set of operating conditions, that include a temperature range of 550-600° C., pressure range of 0.5 to 2.0 kg/cm², catalyst to hydrocarbon feedstock ratio in the range of 10 to 20 wt/wt, riser residence time in the range of 1 to 4 seconds, steam to hydrocarbon feedstock ratio of 5 to 40% by weight.

At block 206, a C4 hydrocarbon and methanol stream are fed into the lower dense riser 2 of a second riser 33. At block 208, light olefins and coked catalyst streams are obtained by cracking the C4 hydrocarbon stream and by converting the methanol stream, in the presence of a second regenerated catalyst in the lower dense riser 2. The cracking and conversion processes are performed in the lower dense riser 2 at a Weight Hourly Space Velocity (WHSV) in the range of 0-20 hr-1 and a temperature in the range of 600-700° C., a pressure in the range of 0.5 to 2.0 kg/cm². The coked catalyst obtained comprises 0-0.1% by weight of coke and provides improved selectivity of light olefins during cracking process in the lower dense riser 2.

At block 210, a crackable recycle stream is fed into the lower dense riser 2 above the C4 hydrocarbon or methanol streams. At block 212 the crackable recycle stream is cracked in the presence of the coked catalyst in the lower dense riser 2 to obtain light olefins and second spent catalyst streams. Such a cracking process is performed under a second set of operating conditions, that include a temperature range of 600-700° C., a pressure range of 0.5 to 2.0 kg/cm², a WHSV in the range of 0-50 hr-1, and a steam to hydrocarbon feedstock ratio of 0 to 5% by weight. Further, the diameter of the lower dense riser 2 is 1.1 to 2 times that of the upper dilute riser 3 and the reaction flux and density of the lower dense riser 2 is almost double that of the first reactor unit.

At block 214, a quenching stream is fed into the upper dilute riser 3 of the second riser 33. At block 216, the second spent catalyst is quenched by the quenching stream in the upper dilute riser 3. The quenching stream includes aromatic rich stream such as Clarified Oil (CLO) and Light Cycle Oil (LCO), further the quenching stream blocks the pores of the second spent catalyst by depositing aromatic molecules and thereby suppressing secondary cracking reactions in the upper dilute riser 3 and thus providing improved selectivity of light olefins during the FCC process.

At block 218, the second spent catalyst and light olefins streams are conveyed through the upper dilute riser 3 with the gas superficial velocity (GSV) of light olefins stream in the upper dilute riser 3 higher than the GSV of the light olefins stream in the lower dense riser 2.

The order in which the process 200 is described is not intended to be construed as a limitation, and the steps described can be combined in other ways obvious to a person skilled in the art. Additionally, individual blocks can be added or deleted from the process without departing from the disclosed present subject matter.

Although the subject matter has been described in considerable detail with reference to certain preferred embodiments thereof, other embodiments are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Example 1

Materials and Methods

The catalytic cracking experiments involving VGO, crude and RCO were carried out in a fixed fluid bed reactor unit. The cracking of iso-butylene and LCN and the oligomerization of methanol were carried out in a micro activity testing (MAT) reactor. The cracking reactions were performed at two different temperature ranges, namely 600-650° C. for cracking methanol, isobuyele and LCN streams, whereas a temperature range of 550-600° C. was used while cracking the hydrocarbon feed steam. The cracking was performed over a variable time on stream (30-75 sec). Catalyst/Oil ratio was varied between 10:1 to 16:1 wt/wt. The gaseous products were analyzed by online GC and liquid products were analyzed using LT Simdis supplied by AC Analytical Controls (ASTM 2887 method). The liquid product cuts considered were Gasoline (C5-221° C.), LCO (221-343° C.) and Bottoms (343° C.+). Conversion was obtained by sum of yields of dry gas, LPG, Gasoline and Coke. The catalyst used for the cracking reactions are steam deactivated fresh FCC catalyst. Hydrothermal deactivation was done at 815° C. for 10 hrs in presence of 100% steam. The detail properties of the hydrotreated VGO feed are listed in Table 1.

TABLE 1

| Properties of hydrotreated VGO feedstock. | |
|---|---|
| Properties | Hydrotreated-VGO |
| Density at 15° C., g/cc | 0.903 |
| Sulphur, wt % | 0.01 |
| CCR, wt % | <0.1 |
| Pour point, ° C. | 39 |
| Viscosity, cSt | 6.9374 |
| ASTM-7169 Distillation, wt % | |
| IBP* | 250 |
| 5 | 338 |
| 10 | 362 |
| 30 | 410 |
| 50 | 443 |
| 70 | 481 |
| 90 | 537 |
| 95 | 561 |
| SARA, wt % | |
| Saturates | 51.6 |
| Aromatics | 42.1 |
| Resin | 6.3 |
| Asphaltenes | Nil |

*IBP—initial boiling point

The Table 1 describes the coke forming tendency of the feedstock in terms of conradson carbon residue (CCR). The aromatic content of the feedstock is provided as part of the SARA (saturate, aromatic, resin and asphaltene) analysis.

Example 2

Preparation of Catalyst Composition

The catalyst composition was prepared by mixing mixing 76-86 wt % of a non-zeolitic material, and 2-30 wt % of at least one zeolite material to obtain a slurry. The next step involved, loading the metals on zeolite-2 of Si/Al ratio of 30 and 80 with 0.5 wt % each of Zn, Mn, Ti and Fe in the slurry. The slurry was then subjected to spray drying, in order to obtain micro-spheres and calcining the micro-spheres at 500-600° C. for 1-2 hours was done to obtain the catalyst composition. The characterization of the catalyst system is given in below table

TABLE 2

Properties of the catalyst composition as described in Example 2

| Parameter | Catalyst Properties |
|---|---|
| Fresh surface area, m2/gm | 150-200 |
| Steamed surface area, m2/gm | 110-150 |
| PV, cc/gm | 0.35-0.4 |
| Rare earth, wt % | 0.3-1 |
| APS, micron | 75-80 |
| ABD, gm/cc | 0.8-0.85 |
| Attrition Index, wt % | <3 |

Example 3

Effect of Si/Al Ratio of Zeolite-2 on Catalysis

The silicon/aluminium content of a zeolite-2 matrix was found to be influential in determining porosity and activity of the catalyst. The Si/Al ratio was accordingly varied to establish an ideal working range. Hydrotreated VGO (Table 1) was used as feed for the experiment. The results have been tabulated below in Table 3.

TABLE 3

Product yields with different Si/Al ratios of zeolite-2.

| Parameter | Non Zeolite:Zeolite-1:Zeolite-2 | |
|---|---|---|
| Composition, wt % | 80:12:8 | |
| Zeolite-2 | Si/Al = 30 | Si/Al = 80 |
| Cracking Temperature, ° C. | 570 | 570 |
| Conversion, wt % | 85 | 85 |
| Product Yields, wt %: | | |
| Coke | 5.63 | 5.60 |
| Dry Gas | 8.29 | 5.58 |
| Ethylene | 5.72 | 3.09 |
| LPG | 41.05 | 41.60 |
| Propylene | 19.54 | 18.72 |
| C4 Olefins | 13.87 | 14.14 |
| Gasoline (C5-221° C.) | 30.03 | 32.22 |
| LCO (221° C.-343° C.) | 9.35 | 9.31 |
| Bottoms (343° C.+) | 5.65 | 5.69 |

The example of the present invention (Table 2) shows that, a change in Si/Al ratio of zeolite-2 to 80 led to a decrease in dry gas is obtained. There was a dry gas reduction of 32.68% (corresponding to 2.71 wt %) associated with the variation of Si/Al ratio from 30 to 80. This was mainly attributed to the reduction in the ethylene content of the dry gas.

Example 4

Effect of Metal Modification of Zeolite-2 on Catalysis

Although the dry gas content (Example 3) was lowered to an acceptable level by modification of the Si/Al, the propylene content was still found to be low. Propylene is a recoverable commodity and hence, an increased propylene content is commercially useful. Metal loading was attempted in order to achieve increased propylene yield. The results are tabulated in Table 4.

TABLE 4

Product yields with metal modified zeolite-2.

| Parameter | Non Zeolite:Zeolite-1:Zeolite-2 | |
|---|---|---|
| Composition, wt % | 80:12.08 | |
| Zeolite-2 | Si/Al = 30 | Si/Al = 80 |
| Cracking Temperature, ° C. | 570 | 570 |
| Conversion, wt % | 85 | 85 |
| Product Yields, wt %: | | |
| Coke | 6.15 | 6.01 |
| Dry Gas | 8.61 | 5.98 |
| Ethylene | 6.04 | 3.40 |
| LPG | 40.25 | 43.20 |
| Propylene | 18.52 | 19.87 |
| C4 Olefins | 13.69 | 14.26 |
| Gasoline (C5-221° C.) | 29.96 | 29.76 |
| LCO (221° C.-343° C.) | 9.40 | 9.41 |
| Bottoms (343° C.+) | 5.63 | 5.64 |

The example as listed in Table 3 is based on the catalytic cracking of hydrotreated VGO (Table 1), where zeolite-2 with Si/Al ratio of 30 and 80 were modified with metals to improve propylene yield in the present invention. The modification of zeolite-2 having a Si/Al ratio of 80 with transition metals (0.5 wt % each of Zn, Mn, Ti and Fe) led to an enhancement of propylene content (19.87 wt % compared to 18.72 wt % in Table 3). Hence, the introduction of metal into the zeolitic matrix was found to enhance propylene selectivity, while maintaining a low dry gas content (the dry gas yield obtained was 5.98 wt %).

Example 5

Effect of Variation in Metal Content of Zeolite-2 on Catalysis

The best performing composition established from Table 2 and 3 was found to have Si/Al ratio of 80. Consequently, experiments were carried out to establish the best working range for the metal loading, while the Si/Al ratio was held constant at 80. Hydrotreated VGO (Table 1) was used for the experiment. The results are tabulated in Table 5.

TABLE 5

Product yields with metal modified zeolite-2.

| Parameter | Non Zeolite:Zeolite-1:Zeolite-2 |
|---|---|
| Composition, wt % | 80:12:08 |
| Zeolite-2 | Si/Al = 80 |
| Cracking Temperature, ° C. | 570 |
| Conversion, wt % | 85 |
| Product Yields, wt %: | |
| Coke | 6.42 |
| Dry Gas | 7.08 |
| Ethylene | 4.50 |
| LPG | 41.65 |
| Propylene | 18.74 |
| C4 Olefins | 13.74 |
| Gasoline (C5-221° C.) | 29.25 |
| LCO (221° C.-343° C.) | 9.76 |
| Bottoms (343° C.+) | 5.84 |

The example as listed in Table 5, is based on modifying zeolite-2 having Si/Al ratio of 80 using higher percentage of transition metals Zn, Mn, Ti and Fe (1 wt % each) as compared to the composition used in Table 4. Using higher wt % of metal loadings yielded more dry gas (7.08 wt %) and ethylene (4.5 wt %). On comparing the results in Table 4 and Table 5, it is clear that 0.5 wt % each of Zn, Mn, Ti and Fe on zeolite-2 matrix (Si/Al ratio of 80) was found to be ideal in providing a high butylene and propylene content, while reducing the level of dry gas (ethylene) content.

Example 6

Catalytic Cracking of Isobutylene Feed Stream

This example is illustrated for catalytic cracking of recycle C4 stream in the lower dense riser. The feed enters at the riser bottom and is cracked using a WHSV of 20 hr$^{-1}$ and gives 0 to 0.1 wt % coke on catalyst. Experiments were conducted in fixed bed microactivity testing (MAT) unit at reaction temperature of 625° C. using 100% isobutylene as feed. The catalyst of the present invention contains zeolite-2 of Si/Al ratio of 80 modified with 0.5 wt % each of Zn, Mn, Ti and Fe as described in Table 4. The results are tabulated in Table 6.

TABLE 6

Product yields for 100% isobutylene cracking.

| Parameter | Non Zeolite:Zeolite-1:Zeolite-2 |
|---|---|
| Composition, wt % | 80:12:8 |
| Cracking Temperature, ° C. | 625 |
| WHSV, hr$^{-1}$ | 20 |
| Zeolite-2 | Si/Al =80 |
| Product Yields, wt %: | |
| Coke | 1.02 |
| Dry Gas | 14.82 |
| Ethylene | 13.15 |
| LPG | 63.48 |
| Propylene | 29.83 |
| C4 Olefins | 16.91 |
| Gasoline | 20.68 |
| Unconverted Isobutylene | 6.73 |

The performance of the catalyst composition in cracking a C4 stream can be found in Table 6. The cracking of isobutylene to yield recoverable propylene can be useful. In accordance, the results in Table 5 indicated a high C3 content (29.83 wt %), while the unconverted isobutylene content was found to have a low value of 6.73 wt %.

Example 7

Catalytic Cracking of LCN Feed Stream

Typical properties of light cracked naphtha (LCN) feed used for cracking are given in Table 7.

TABLE 7

Properties of LCN feed.

| Properties | LCN |
|---|---|
| Density at 15° C., g/cc | 0.675 |
| Sulphur, ppm | <10 |
| Distillation, wt % (ASTM-D86) | |
| 5 | 35 |
| 95 | 99 |

This example as listed in table 7 is based on the catalytic cracking of 100% light cracked naphtha (LCN) in the denser riser at reaction temperature of 600° C. (Table 8) with WHSV of 40 hr$^{-1}$. Feed is injected above the C4 stream injection and is cracked on the coked catalyst of Example 5. The catalyst of the present invention contains zeolite-2 of Si/Al ratio of 80 modified with 0.5 wt % each of Zn, Mn, Ti and Fe as described in Table 3. The results are tabulated in Table 8.

TABLE 8

Product yields for LCN feed cracking.

| Parameter | Non Zeolite:Zeolite-1:Zeolite-2 |
|---|---|
| Composition, wt % | 80:12:8 |
| Cracking Temperature, ° C. | 600 |
| WHSV, hr-1 | 40 |
| Zeolite-2 | Si/Al = 80 |
| Conversion, wt % | 99.14 |
| Product Yields, wt %: | |
| Coke | 3.68 |
| Dry Gas | 11.75 |
| Ethylene | 9.16 |
| LPG | 31.05 |
| Propylene | 18.82 |
| C4 Olefins | 8.96 |
| C5-90 | 29.65 |
| 90-221 | 23.01 |
| 221+ | 0.86 |

A high propylene yield from the LCN cracking can be observed in Table 8. The tables 6 and 8 helps establish the activity of catalyst composition when using recycle feed stream. Recycling of C4 stream (5-10 wt % of fresh feed) and recycling LCN (10 wt % of fresh feed) gives an increase in propylene yield from 3.5 to 4.5 wt % on fresh feed basis as compared to Table 4.

Example 8

Catalytic Oligomerization of Methanol Feed Stream

This example is illustrated for catalytic oligomerization of low value stream such as methanol in the lower dense riser. Experiments were conducted in fixed bed MAT unit at reaction temperature of 625° C. using 100% methanol with WHSV of 20 hr$^{-1}$. The catalyst of the present invention contains zeolite-2 of Si/Al ratio of 80 modified with 0.5 wt % each of Zn, Mn, Ti and Fe as described in Table 4. The results are tabulated in Table 9.

TABLE 9

Product yields for 100% methanol oligomerization.

| Parameter | Non Zeolite:Zeolite-1:Zeolite-2 |
|---|---|
| Composition, wt % | 80:12:8 |
| Cracking Temperature, ° C. | 625 |
| WHSV, hr-1 | 20 |
| Zeolite-2 | Si/Al = 80 |
| Product Yields, wt %: | |
| Coke | 1.73 |
| Dry Gas | 11.70 |
| Ethylene | 6.88 |
| LPG | 20.27 |
| Propylene | 11.63 |
| C4 Olefins | 6.44 |
| Liquid Yield (Hydrocarbon + water) | 66.3 |

The broad applicability of the catalyst can be inferred from the conversion data provided in Table 9. The acidic zeolite (ZSM-5) converts methanol into olefins. The methanol and intermediate species get occluded into the pores of the zeolitic material and get converted to light olefins (ethylene, propylene etc). A high propylene content of 11.63 wt % was obtained for the low value methanol stream.

Example 9

Catalytic Cracking of Resid Feed Stream

This example is illustrated for catalytic cracking of 100% resid feed streams like RCO (reduced crude oil) in the first riser. The feed properties are listed and product yields table 10.

TABLE 10

Properties of Bombay high RCO (BH RCO) feed.

| Properties | BH RCO |
|---|---|
| Density at 15° C., gm/cc | 0.902 |
| Sulphur, wt % | 0.29 |
| CCR, wt % | 3.2 |
| Viscosity, cSt @80° C. | 8.2 |
| Asphaltenes | 1.15 |

Experiments were conducted in the first riser at reaction temperature of 570° C. using BH RCO with WHSV of 20 hr$^{-1}$ and a catalyst to oil ratio of 12 (wt/wt). The catalyst of the present invention contains zeolite-2 of Si/Al ratio of 80 modified with 0.5 wt % each of Zn, Mn, Ti and Fe as described in Table 4. The results are tabulated in Table 11.

TABLE 11

Product yields for BH RCO cracking.

| Parameter | Non Zeolite:Zeolite-1:Zeolite-2 |
|---|---|
| Composition, wt % | 80:12:8 |
| Zeolite-2 | Si/Al = 80 |
| Cracking Temperature, ° C. | 570 |
| Cat/oil, wt/wt | 12 |
| Product Yields, wt %: | |
| Coke | 8.19 |
| Dry Gas | 6.58 |
| Ethylene | 3.78 |
| LPG | 40.85 |
| Propylene | 19.05 |
| C4 Olefins | 13.75 |
| Gasoline (C5-221° C.) | 26.98 |
| LCO (221° C.-343° C.) | 11.37 |
| Bottoms (343° C.+) | 6.04 |

The catalytic cracking of BH RCO resid stream (Table 11) using the catalyst composition (as described in Example 2) gives 19.05 wt % propylene and 13.75 wt % butylene. This is quite impressive, when we consider the low ethylene content (3.78 wt %).

Example 10

Catalytic Cracking of Crude

This example is illustrated for catalytic cracking of 100% Bombay high (BH) crude in the first riser. The feed properties are listed and product yields table 12.

TABLE 12

Properties of Bombay high crude.

| Properties | BH Crude |
|---|---|
| Density at 15° C., gm/cc | 0.8243 |
| Sulphur, wt % | 0.135 |
| CCR, wt % | 1.35 |

TABLE 12-continued

Properties of Bombay high crude.

| Properties | BH Crude |
|---|---|
| Viscosity, cSt @ 40° C. | 3.395 |
| UOP K | 12.0 |
| Asphaltenes | 1.21 |

Experiments were conducted in the first riser at reaction temperature of 570° C. using BH RCO with WHSV of 20 hr$^{-1}$ and a catalyst to oil ratio of 12 (wt/wt). The catalyst of the present invention contains zeolite-2 of Si/Al ratio of 80 modified with 0.5 wt % each of Zn, Mn, Ti and Fe as described in Table 4. The results are tabulated in Table 13.

TABLE 13

Product yield for BH crude cracking.

| Parameter | Non Zeolite:Zeolite-1:Zeolite-2 |
|---|---|
| Composition, wt % | 80:12:08 |
| Zeolite-2 | Si/Al = 80 |
| Cracking Temperature, ° C. | 570 |
| Cat/oil, wt/wt | 12 |
| Product Yields, wt %: | |
| Coke | 3.81 |
| Dry Gas | 6.03 |
| Ethylene | 2.70 |
| LPG | 29.21 |
| Propylene | 13.44 |
| C4 Olefins | 8.78 |
| Gasoline (C5-221° C.) | 44.32 |
| LCO (221° C.-343° C.) | 12.69 |
| Bottoms (343° C.+) | 3.95 |

The catalytic cracking of BH crude (Table 13) using the catalyst composition (as described in Example 2) yielded 13.44 wt % propylene and 8.78 wt % C4 olefins. The ethylene content was also found to be quite low (2.70 wt %), further highlighting the usefulness of the catalyst composition.

Overall, the comparison of Tables 3-13 helps establish the efficacy of the catalytic composition (described in Example 2). Tables 3-5 identify the best performing catalyst composition, as having zeolite-2 with a Si/Al ratio of 80 and having 0.5 wt % each of Zn, Mn, Ti and Fe. The enhancement provided by the metal loading is apparent from the Tables 4-5. Furthermore, the performance of the catalyst was found to be consistently good against various different substrates (Tables 6-13).

As is clear from examples 1-10, the present disclosure provides a catalyst composition that allows the efficient cracking of petroleum-based olefins to highly useful low carbon components such as propylene and butylene. The high selectivity of the catalyst is highlighted in the reduction of undesirable dry gas (and ethylene) content from the product stream.

Although the subject matter has been described in considerable detail with reference to certain examples and implementations thereof, other implementations are possible.

We claim:

1. A catalyst composition comprising:
a) a non-zeolitic material having a weight percentage in the range of 76-86% with respect to the catalyst composition;

b) a zeolite-1 having a weight percentage in the range of 3-18% with respect to the catalyst composition; and c) a zeolite-2 having a weight percentage in the range of 2-12% with respect to the catalyst composition, wherein the zeolite-2 is modified with at least one metal having a weight percentage in the range of 0.1-2.5% with respect to the zeolite-2, wherein the at least one metal comprises Ti in combination with Mn, Fe, and Zn.

2. The catalyst composition as claimed in claim 1, wherein the zeolite-1 is selected from the group consisting of ultra-stable Y (USY), rare earth exchanged ultra-stable Y (REUSY), beta, and combinations thereof.

3. The catalyst composition as claimed in claim 1, wherein the zeolite-2 is selected from the group consisting of ZSM-5, ZSM-11, ZSM-22, SAPO-11, and combinations thereof.

4. The catalyst composition as claimed in claim 1, wherein the zeolite-1 has a pore size in the range of 7-8 Å.

5. The catalyst composition as claimed in claim 1, wherein the zeolite-2 has a pore size in the range of 5-6 Å.

6. The catalyst composition as claimed in claim 1, wherein the zeolite-2 has a Si/Al ratio in the range of 30-500.

7. The catalyst composition as claimed in claim 1, wherein the zeolite-2 has a Si/Al ratio in the range of 30-100.

8. The catalyst composition as claimed in claim 1, wherein the zeolite-2 has a Si/Al ratio of 80.

9. The catalyst composition as claimed in claim 1, wherein the non-zeolitic material is a combination of a) active material selected from the group consisting of silica, alumina, and combinations thereof; and b) inactive material selected from the group consisting of silica-alumina, kaolin clay, montmorillonite clay, bentonites clay, halloysite clay, and combinations thereof.

10. The catalyst composition as claimed in claim 9, wherein the active to inactive material weight ratio is in the range of 1:2-1:2.5.

11. The catalyst composition as claimed in claim 1, wherein the zeolite-2 is modified with 0.5 wt % of at least one metal with respect to the zeolite-2; wherein the at least one metal is a Ti in combination with Mn, Fe, and Zn.

12. The catalyst composition as claimed in claim 1, for use in cracking a hydrocarbon feedstock to obtain light olefins.

13. The catalyst composition as claimed in claim 1, for use in oligomerization of $C_{1-4}$ hydrocarbon to obtain light olefins.

* * * * *